(12) United States Patent
Okubo (10) Patent No.: US 11,216,678 B2
(45) Date of Patent: Jan. 4, 2022

(54) VEHICLE EXTERIOR ENVIRONMENT RECOGNITION APPARATUS AND VEHICLE EXTERIOR ENVIRONMENT RECOGNITION METHOD

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 77 days.

(21) Appl. No.: 16/667,274

(22) Filed: Oct. 29, 2019

(65) Prior Publication Data

US 2020/0160074 A1    May 21, 2020

(30) Foreign Application Priority Data

Nov. 21, 2018  (JP) .............................. JP2018-218614

(51) Int. Cl.
  *G06K 9/00*   (2006.01)
  *G06T 7/20*   (2017.01)
  *G06T 7/70*   (2017.01)

(52) U.S. Cl.
  CPC ..... *G06K 9/00825* (2013.01); *G06K 9/00201* (2013.01); *G06K 9/00798* (2013.01); *G06K 9/00805* (2013.01); *G06T 7/20* (2013.01); *G06T 7/70* (2017.01); *G06T 2207/30252* (2013.01)

(58) Field of Classification Search
  None
  See application file for complete search history.

(56) References Cited

U.S. PATENT DOCUMENTS

| 2008/0181461 A1* | 7/2008 | Saito | G06K 9/00825 |
| | | | 382/104 |
| 2015/0145956 A1* | 5/2015 | Hayakawa | G06K 9/00791 |
| | | | 348/46 |

FOREIGN PATENT DOCUMENTS

JP    3349060 B2    11/2002

* cited by examiner

*Primary Examiner* — Leon Flores
(74) *Attorney, Agent, or Firm* — McDermott Will & Emery LLP (57) ABSTRACT

A vehicle exterior environment recognition apparatus includes a position derivation unit, a grouping unit, and a speed derivation unit. The position derivation unit is configured to derive three-dimensional positions of respective blocks from an image received from an imaging device. The grouping unit is configured to group the respective blocks and to identify a three-dimensional object. The speed derivation unit is configured to make a determination as to whether a side of the three-dimensional object satisfies a determination condition that the side of the three-dimensional object is included in an end area situated on an end side of the image in a horizontal direction. The speed derivation unit is configured to derive the speed of the three-dimensional object in accordance with an end of the side of the three-dimensional object in a depth direction when the determination is made that the side of the three-dimensional object satisfies the determination condition.

10 Claims, 8 Drawing Sheets

VEHICLE EXTERIOR ENVIRONMENT RECOGNITION APPARATUS AND VEHICLE EXTERIOR ENVIRONMENT RECOGNITION METHOD

CROSS-REFERENCE TO RELATED APPLICATIONS

The present application claims priority from Japanese Patent Application No. 2018-218614 filed on Nov. 21, 2018, the entire contents of which are hereby incorporated by reference.

BACKGROUND

The disclosure relates to a vehicle exterior environment recognition apparatus and a vehicle exterior environment recognition method for identifying a three-dimensional object that is present in a travel direction of an own vehicle.

A technology for detecting a three-dimensional object such as a vehicle situated ahead of an own vehicle to avoid a collision with a preceding vehicle (collision avoidance control) or to control the distance to a preceding vehicle so as to maintain a safe distance (cruise control) is known (for instance, Japanese Patent No. 3349060).

SUMMARY

An aspect of the present disclosure provides a vehicle exterior environment recognition apparatus including a position derivation unit, a grouping unit, and a speed derivation unit. The position derivation unit is configured to derive three-dimensional positions of respective blocks from an image obtained from an imaging device. The grouping unit is configured to group the respective blocks and to identify a three-dimensional object. The speed derivation unit is configured to make a determination as to whether a side of the three-dimensional object satisfies a determination condition that the side of the three-dimensional object is included in an end area situated on an end side of the image in a horizontal direction, and derive the speed of the three-dimensional object in accordance with an end of the side of the three-dimensional object in a depth direction when the determination is made that the side of the three-dimensional object satisfies a determination condition.

An aspect of the present disclosure provides a vehicle exterior environment recognition method. The method includes deriving three-dimensional positions of respective blocks from an image received from an imaging device. The method includes grouping the respective blocks and identifying a three-dimensional object. The method includes making a determination as to whether a side of the three-dimensional object satisfies a determination condition that the side of the three-dimensional object is included in an end area situated on an end side of the image in a horizontal direction, and deriving the speed of the three-dimensional object in accordance with an end of the side of the three-dimensional object in a depth direction when the determination is made that the side of the three-dimensional object satisfies the determination condition.

An aspect of the present disclosure provides a vehicle exterior environment recognition apparatus including circuitry. The circuitry is configured to derive three-dimensional positions of respective blocks from an image received from an imaging device. The circuitry is configured to group the respective blocks and to identify a three-dimensional object. The circuitry is configured to make a determination as to whether a side of the three-dimensional object satisfies a determination condition that the side of the three-dimensional object is included in an end area situated on an end side of the image in a horizontal direction, and derive a speed of the three-dimensional object in accordance with an end of the side of the three-dimensional object in a depth direction when the determination is made that the side of the three-dimensional object satisfies the determination condition.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

In order to accomplish collision avoidance control or cruise control, for instance, in a distance image in front of a vehicle generated by employing stereo image processing, blocks adjacent to each other in three dimensions are grouped separately as, for instance, the back or the side of a three-dimensional object. According to the size and the speed of the three-dimensional object identified by grouping, collision avoidance control or cruise control are carried out.

When part of a vehicle is not involved in the field of view at a horizontal end side of the image, nothing but the side (more specifically, the forward side) of the vehicle can be viewed, and as a result, the side is used as the basis for deriving the speed. However, when it is attempted to derive the speed by simply using as the basis a center position of the side of the vehicle in a horizontal plane, the speed cannot be derived stably and accurately because the center position changes depending on the degree of exposure in the image (depending on the condition in which the vehicle relatively moves forward or backward).

In view of this problem, it is desirable to provide a vehicle exterior environment recognition apparatus and a vehicle exterior environment recognition method that enable improvement of the accuracy of derivation of speed of a vehicle other than an own vehicle.

Vehicle Exterior Environment Recognition System 100

Figure 1:
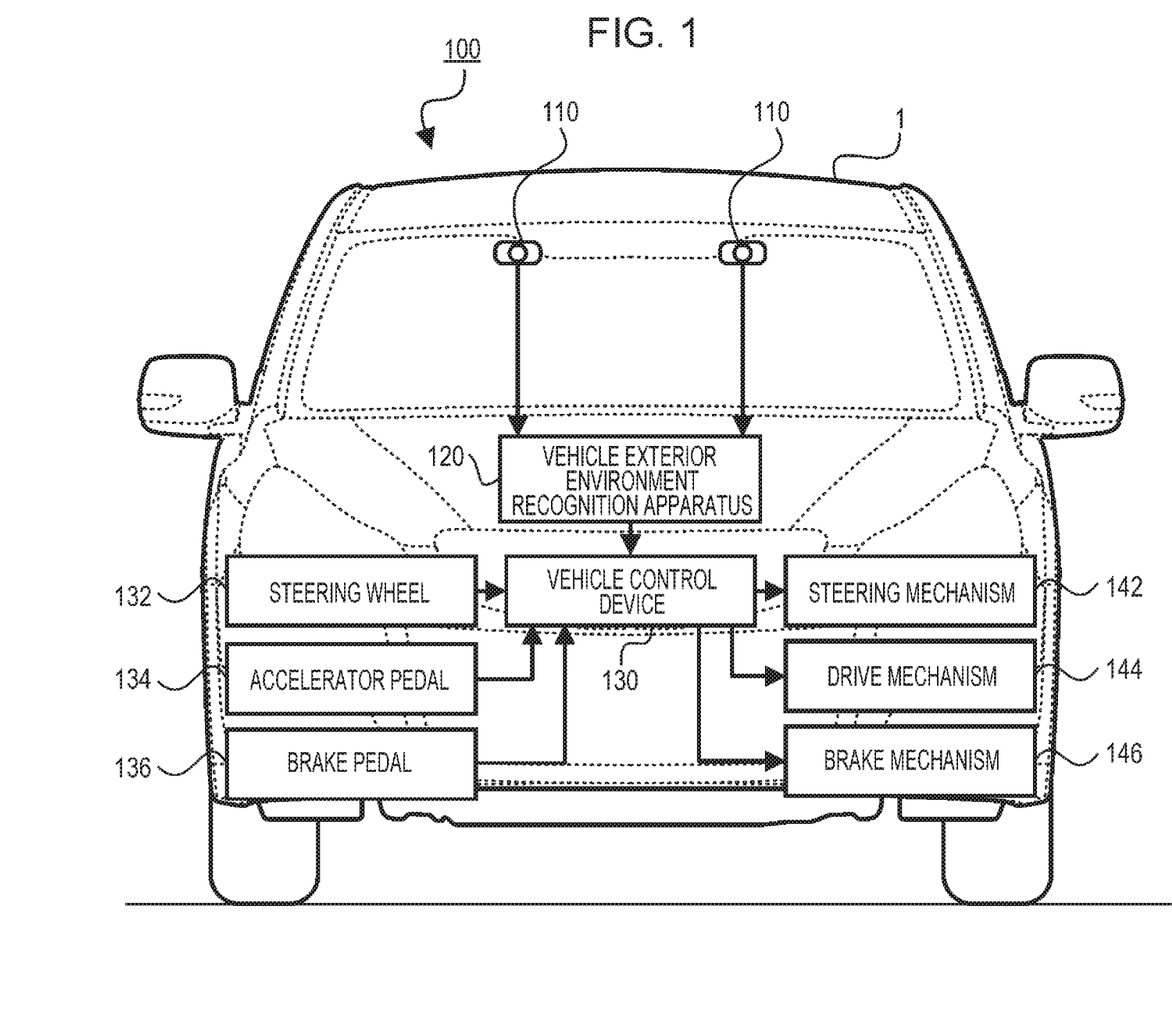
FIG. 1 is a block diagram illustrating connection relationships in a vehicle exterior environment recognition system according to an embodiment of the disclosure.

FIG. 1 is a block diagram illustrating connection relationships in a vehicle exterior environment recognition system 100. The vehicle exterior environment recognition system 100 involves an own vehicle 1 including an imaging device 110, a vehicle exterior environment recognition apparatus 120, and a vehicle control device (engine control unit (ECU)) 130.

The imaging device 110 includes an imaging element, such as a charge-coupled device (CCD) or a complementary metal-oxide semiconductor (CMOS) device. The imaging device 110 captures an image of exterior environment ahead of the own vehicle 1 and generates a luminance image (a color or monochrome image) containing at least luminance information. The imaging device 110 is constituted by two imaging devices 110 spaced apart along a substantially horizontal axis to position optical axes of the two imaging devices 110 in substantially parallel to each other in a travel direction of the own vehicle 1. The imaging device 110 generates a luminance image of a three-dimensional object present in a detection area ahead of the own vehicle 1 successively, for instance, every 1/60 second frame (60 fps). The three-dimensional objects recognized by the imaging device 110 include objects that are individually present, such as a bicycle, a pedestrian, a vehicle, traffic signals, a traffic sign, a guard rail, and a building, and also includes objects that are each specified as part of a corresponding object of those, such as the back and side of a vehicle and a wheel of a bicycle. Here, the back of a vehicle denotes any face of the vehicle facing the front of the own vehicle 1 and does not denote the rear face of the vehicle. Similarly, the side of a vehicle denotes any face of the vehicle facing a side of the own vehicle 1 and viewed from the own vehicle 1 and does not denote a side face of the vehicle.

The vehicle exterior environment recognition apparatus 120 obtains a luminance image from each of the two imaging devices 110 and generates a distance image by employing a pattern matching technique. The vehicle exterior environment recognition apparatus 120 derives information about position in three-dimensional space with respect to a real space, the information including a distance relative to the own vehicle 1, by employing a stereo method in accordance with the distance image. The luminance image, the distance image, the pattern matching, and the stereo method will be described in detail later.

Subsequently, the vehicle exterior environment recognition apparatus 120 firstly identifies a road surface by using the derived position information and groups blocks representatively situated on the identified road surface as, for instance, the back or side of a three-dimensional object. Blocks are grouped together when the blocks have an identical color value and are adjacent to each other with respect to three-dimensional position information. The vehicle exterior environment recognition apparatus 120 identifies the three-dimensional object as a particular specific object (for instance, a preceding vehicle). When the vehicle exterior environment recognition apparatus 120 identifies the three-dimensional object as a specific object, the vehicle exterior environment recognition apparatus 120 controls, in accordance with the size and the speed of the specific object, the own vehicle 1 so as to avoid a collision with the specific object (collision avoidance control) or to maintain a safe distance to a preceding vehicle (cruise control).

The vehicle control device 130 controls the own vehicle 1 by receiving an input of driver's operation through a steering wheel 132, an accelerator pedal 134, or a brake pedal 136 and transmitting the input to a steering mechanism 142, a drive mechanism 144, or a brake mechanism 146. The vehicle control device 130 controls the steering mechanism 142, the drive mechanism 144, and the brake mechanism 146 by following instructions provided by the vehicle exterior environment recognition apparatus 120.

Vehicle Exterior Environment Recognition Apparatus 120

Figure 2:
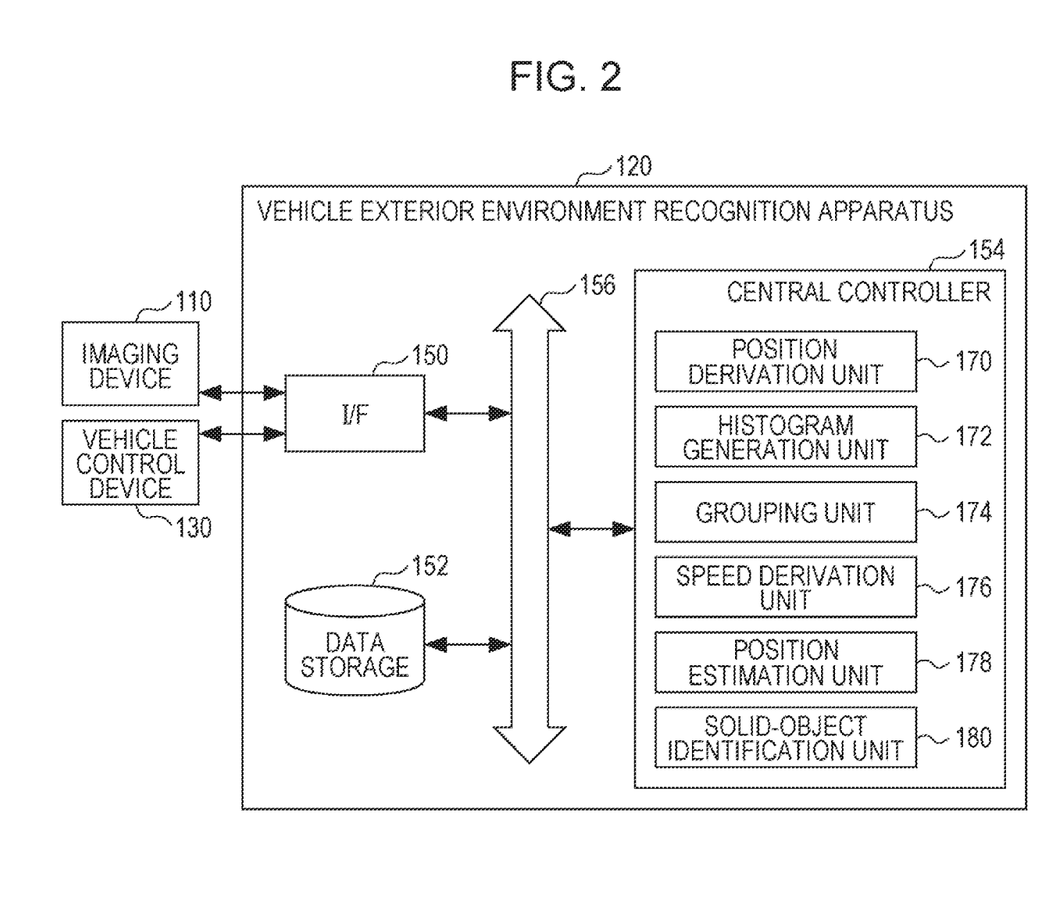
FIG. 2 is a functional block diagram outlining functions of a vehicle exterior environment recognition apparatus.

FIG. 2 is a functional block diagram outlining functions of the vehicle exterior environment recognition apparatus 120. As illustrated in FIG. 2, the vehicle exterior environment recognition apparatus 120 includes an interface (I/F) 150, data storage 152, and a central controller 154.

The I/F 150 is an interface capable of communicating information bidirectionally with the imaging device 110 and the vehicle control device 130. The data storage 152 is constituted by, for instance, a random-access memory (RAM), a flash memory, or a hard disk drive (HDD) and retains various kinds of information to be used for processing of functional units described later.

The central controller 154 is constituted by a semiconductor integrated circuit including a central processing unit (CPU), a read-only memory (ROM) in which a program and the like are stored, and a RAM serving as a work area and controls, for instance, the I/F 150 and the data storage 152 via a system bus 156. In this embodiment, the central controller 154 functions as a position derivation unit 170, a histogram generation unit 172, a grouping unit 174, a speed derivation unit 176, a position estimation unit 178, and a three-dimensional-object identification unit 180. Hereinafter, the description is made in detail in accordance with operations of the functional units of the central controller 154.

Vehicle Exterior Environment Recognition Method

Figure 3:
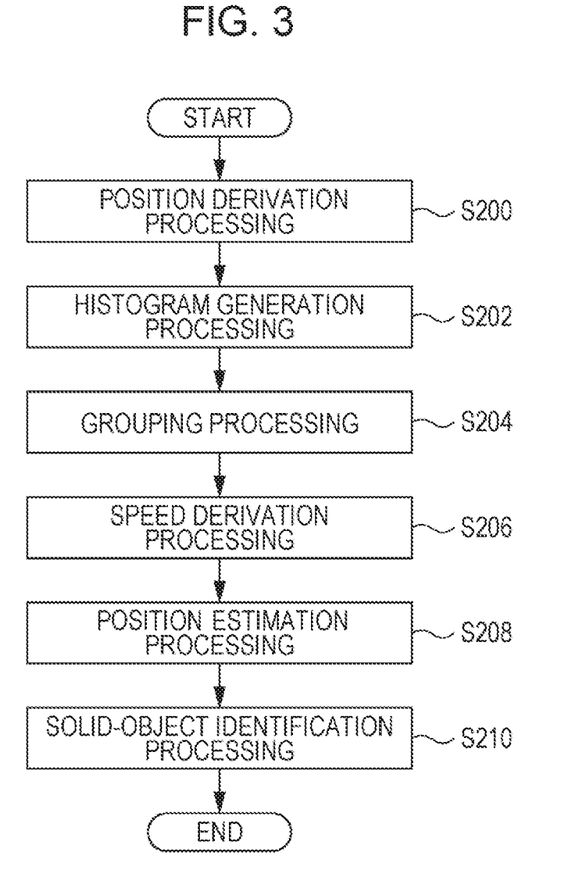
FIG. 3 is a flowchart illustrating a processing flow of a vehicle exterior environment recognition method.

FIG. 3 is a flowchart illustrating a processing flow of a vehicle exterior environment recognition method. In the vehicle exterior environment recognition method, the position derivation unit 170 derives a three-dimensional position of each block in a luminance image obtained from the imaging device 110 (position derivation processing S200); the histogram generation unit 172 sections a distance image into multiple section areas and generates a histogram for each section area (histogram generation processing S202); the grouping unit 174 performs grouping for the blocks and accordingly identifies a three-dimensional object (grouping processing S204); the speed derivation unit 176 derives the speed of the three-dimensional object identified by grouping blocks (speed derivation processing S206); the position estimation unit 178 estimates a current position of an end of the side of the three-dimensional object in a depth direction of the three-dimensional object (position estimation processing S208); and the three-dimensional-object identification unit 180 identifies the three-dimensional object as a particular specific object (three-dimensional-object identification processing S210).

Position Derivation Processing S200

The position derivation unit 170 obtains a luminance image from each of the two imaging devices 110, searches one of the luminance images for a block (for instance, an array of four horizontal pixels by four vertical pixels) corresponding to a particular block extracted from the other of the luminance images (pattern matching), and accordingly derives parallax information (corresponding to a relative distance z described later) indicating a parallax. The position derivation unit 170 generates a distance image by allotting the derived parallax information to each block. While the block is composed of four horizontal pixels by four vertical pixels in this instance, the number of pixels in a block can be set at any number. Alternatively, a single pixel may be used instead of a block. "Horizontal" denotes a lateral axis of an image plane, "vertical" denotes a longitudinal axis of the image plane, and "depth" denotes a depth axis of the image plane.

Figure 4A:
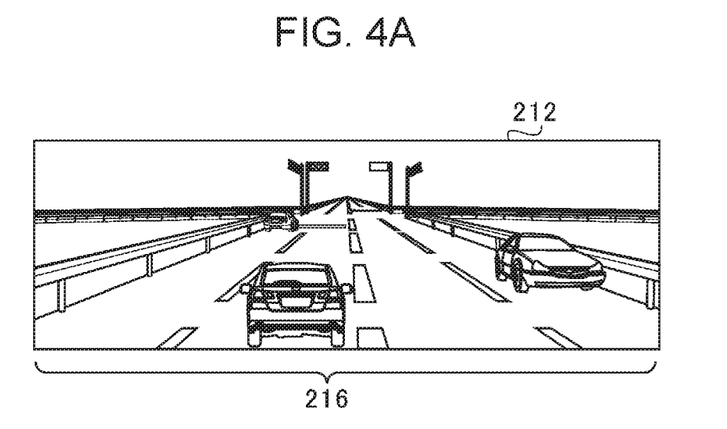
FIGS. 4A and 4B are illustrations depicting a luminance image and a distance image.
Figure 4B:
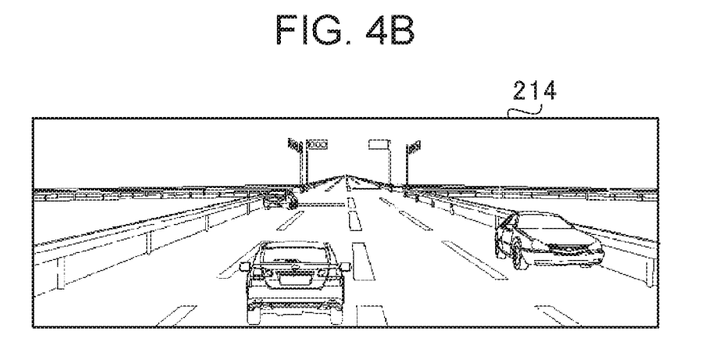

FIGS. 4A and 4B are illustrations depicting a luminance image 212 and a distance image 214. For instance, it is assumed that the luminance image 212 as in FIG. 4A is generated with respect to a detection area 216 by using the two imaging devices 110. In the drawing, for ease of understanding, one of the luminance images 212 generated separately by the imaging devices 110 is schematically illustrated. In this embodiment, the position derivation unit 170 measures a parallax with respect to each block in accordance with the luminance images 212 and forms the distance image 214 as in FIG. 4B. Each block in the distance image 214 is associated with parallax information of the block. In the drawing, for ease of description, black dots indicate blocks for which parallax information is derived.

The position derivation unit 170 converts parallax information of each block in the distance image 214 into information of three-dimensional position in a real space containing a horizontal distance x, a height y, and the relative distance z by employing the stereo method. Here, the stereo method is a method of deriving the relative distance z relative to the imaging device 110 with respect to a particular block (a pixel or a block composed of multiple pixels) in accordance with a corresponding parallax regarding the particular block in the distance image 214 by employing a triangulation method. At this time, the position derivation unit 170 derives the height y from a road surface with respect to the particular block in accordance with the relative distance z with respect to the block and a measured distance from the block to a point on a road surface apart from the block by the relative distance z in the distance image 214. The derived three-dimensional position information is newly associated with the distance image 214. Since various known technologies can be applied to processing for deriving the relative distance z and processing for specifying a three-dimensional position, the description thereof is omitted.

Histogram Generation Processing S202

The histogram generation unit 172 sections the distance image 214 into multiple section areas and generates, with respect to each section area, a histogram (a frequency distribution) in which relative distances of multiple blocks in a particular section area are classified into multiple classes (distance divisions of relative distance obtained by dividing distance equally by a given distance and arranged in an order starting from a shortest distance). Hereinafter, processing of the histogram generation unit 172 is specifically described.

Figure 5A:
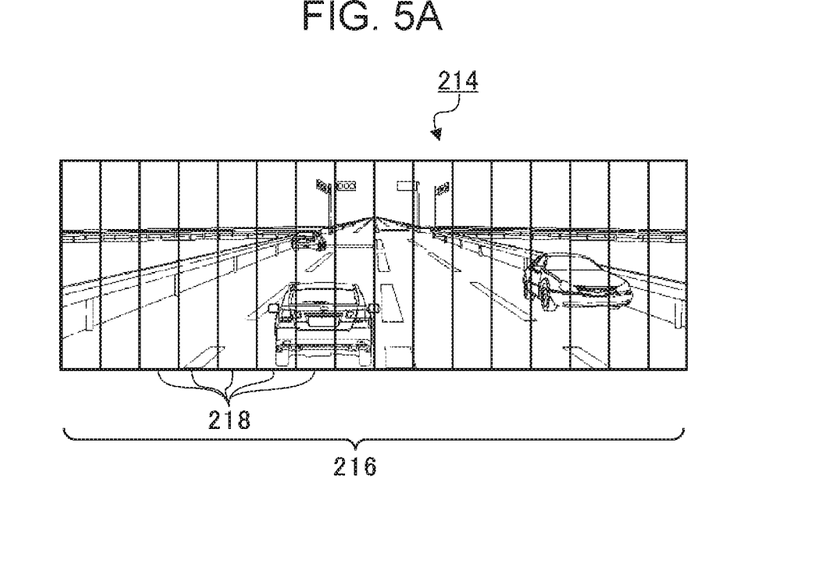
FIGS. 5A and 5B are illustrations depicting processing of a histogram generation unit.

FIGS. 5A and 5B are illustrations depicting the processing of the histogram generation unit 172. The histogram generation unit 172 firstly sections the distance image 214 into multiple section areas 218 in a horizontal direction. The section areas 218 are each formed in a strip shape extending in a vertical direction as illustrated in FIG. 5A. While in this description the section areas 218 in a strip shape are formed by evenly dividing the distance image 214 by 16 areas for ease of description, the number of divisions may be set at any number, such as 150.

Figure 5B:
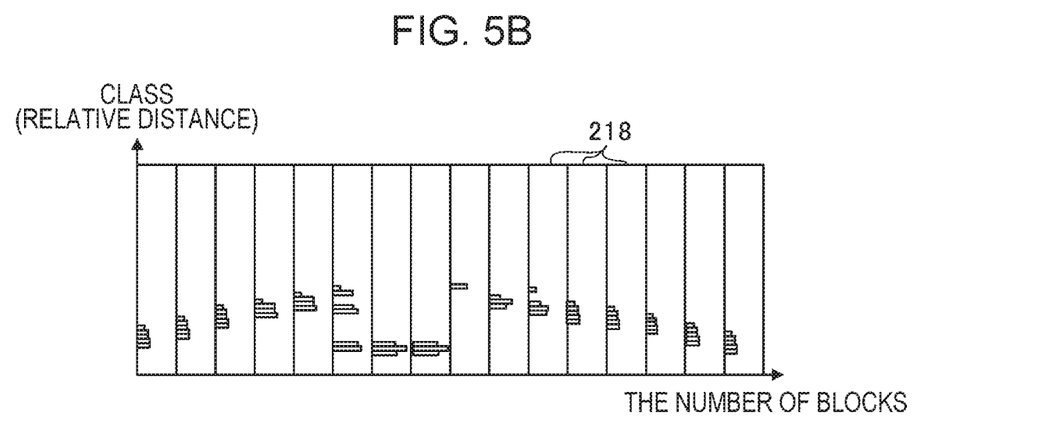

Subsequently, the histogram generation unit 172 determines, with respect to each of the section areas 218 in accordance with three-dimensional position information, which class of the multiple classes includes a corresponding relative distance regarding each block of all blocks that are assumed to situate on or higher than a road surface in the section areas 218 and associate the relative distances of the all blocks individually with corresponding classes, such that the histogram generation unit 172 generates histograms (indicated by horizontally elongated rectangles (bars) in FIG. 5B). Accordingly, distance distributions of the respective section areas 218 represented by the histograms are obtained as illustrated in FIG. 5B. Here, the longitudinal axis indicates classes formed by grouping relative distances in accordance with given equal distances while the lateral axis indicates the number (the frequency) of blocks classified into a corresponding class. It is noted that FIG. 5B illustrates an imaginary display image used for computation and the display image is not generated in an actually visible manner.

Grouping Processing S204

The grouping unit 174 groups together blocks each associated with the three-dimensional position information in the distance image 214 corresponding to a given distance range, and accordingly, a three-dimensional object is identified.

FIGS. 6, and 7A to 7C are illustrations depicting processing of the grouping unit 174. The grouping unit 174 firstly refers to the distance distributions of the section areas 218 and determines as a representative distance 220, with respect to each of the section areas 218, a class of the highest frequency (indicated by a rectangle painted in black in FIG. 6) in a particular section area of the section areas 218.

Figure 6:
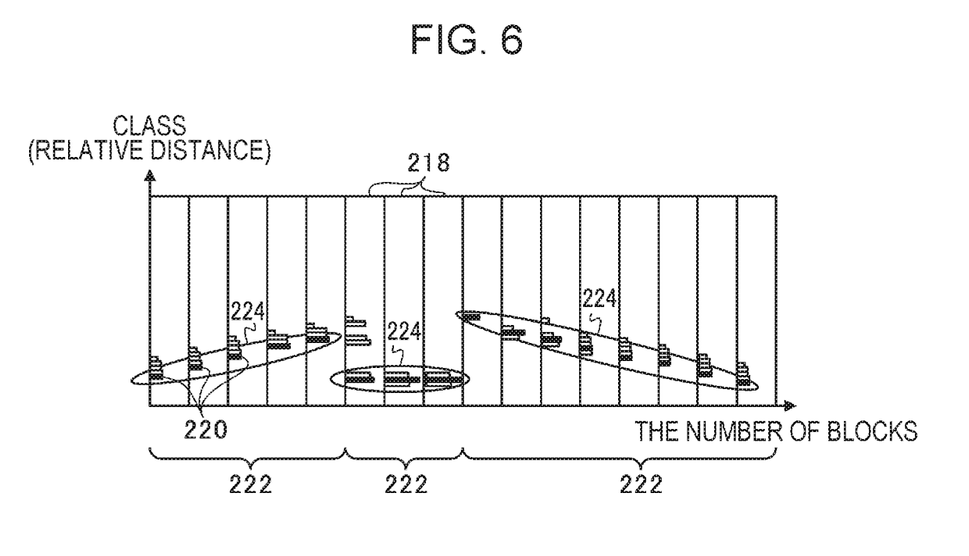
FIG. 6 is an illustration depicting processing of a grouping unit.

Subsequently, the grouping unit 174 compares adjacent section areas of the section areas 218 and groups together particular section areas of the section areas 218 when the representative distances 220 of the particular section areas are close to each other (for instance, situated within 1.0 m), and accordingly, section area groups 222 are created as illustrated in FIG. 6. When the representative distances 220 of three or more section areas of the section areas 218 are close to each other, all the three or more contiguous section areas of the section areas 218 are grouped together as the section area group 222. By performing grouping in this manner, the size in a width direction of a three-dimensional object situated on or higher than a road surface and a direction of the of three-dimensional object in a horizontal plane can be specified.

Subsequently, the grouping unit 174 determines as a reference block a particular block in the section area group 222 whose relative distance z is the representative distance 220. The grouping unit 174 then groups together the particular block and another particular block on the basis of the assumption that the particular blocks correspond to an identical specific object when the differences between the particular block and the other particular block in the horizontal distance x, the height y, and the relative distance z are each within a predetermined range (for instance, ±0.1 m). In this manner, an imaginary block group is created. The predetermined range is denoted by a distance in a real space and can be set at any value by a manufacturer, a driver, or a passenger. The grouping unit 174 also determines as a reference block a block newly added to a particular section area group by grouping and groups together the new block and another block when the differences between the new block and the other block in the horizontal distance x, the height y, and the relative distance z are each within the predetermined range. Consequently, all blocks assumed to correspond to an identical specific object are grouped together.

Figure 7A:
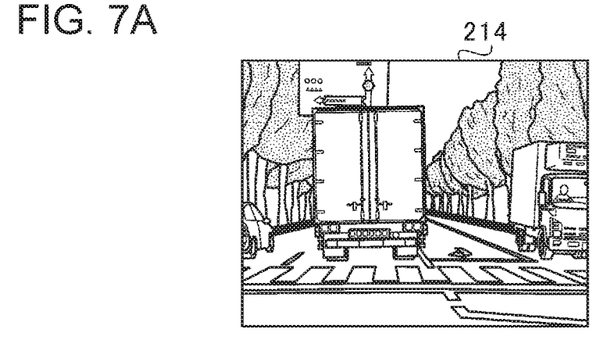
FIGS. 7A to 7C are illustrations depicting processing of the grouping unit.
Figure 7B:
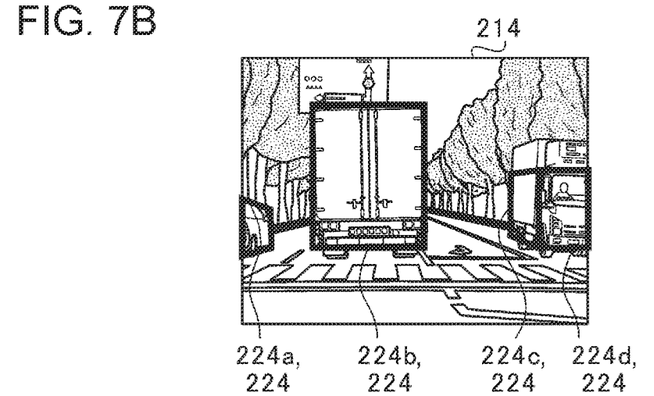

Here, it is assumed that the distance image 214 of a kind illustrated in FIG. 7A is generated. The grouping unit 174 performs grouping for blocks in the distance image 214. Accordingly, multiple block groups identified by grouping are extracted as illustrated in FIG. 7B. The grouping unit 174 determines rectangular frames (planes) as three-dimensional objects 224 (224a, 224b, 224c, and 224d). Regarding each of the rectangular frames, horizontal and vertical lines or a line extending in the depth direction and a vertical line form the periphery of an outer shape involving all corresponding grouped blocks. In this manner, the size and the position of each of the three-dimensional objects 224 are specified.

Figure 7C:
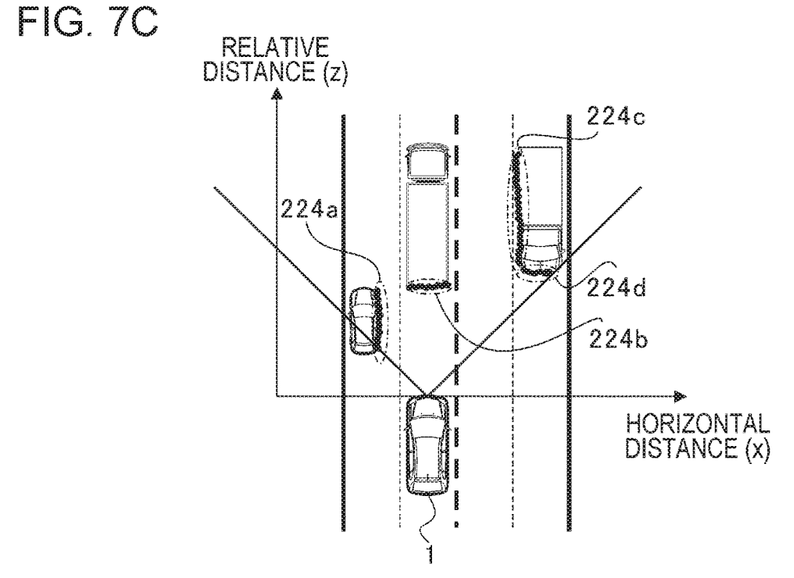

When the block groups are illustrated in a two-dimensional horizontal plane (a plane formed by horizontal and depth axes) indicated by the horizontal distance x and the relative distance z, the three-dimensional objects 224a, 224b, 224c, and 224d are illustrated as in FIG. 7C.

Speed Derivation Processing S206

The speed derivation unit 176 derives the speed of the three-dimensional object 224 identified by grouping. For instance, concerning the three-dimensional objects 224a and 224c in FIG. 7B, the speed derivation unit 176 derives a speed with respect to the side of the three-dimensional object 224; concerning the three-dimensional objects 224b and 224d, the speed derivation unit 176 derives a speed with respect to the back of the three-dimensional object 224. It is noted that, since the three-dimensional objects 224c and 224d correspond to the side and back of an identical three-dimensional object of the three-dimensional object 224, a speed can be derived as the speed of a single three-dimensional object of the three-dimensional object 224.

However, as illustrated in FIG. 7C, part of the three-dimensional object 224a is not included in the field of view at a horizontal end side (the left end side in this instance) of the distance image 214 and nothing but the side (more specifically, the forward side) of the three-dimensional object 224a can be viewed. In this case, the speed derivation unit 176 uses the side of the three-dimensional object 224a as the basis for deriving the speed of the three-dimensional object 224a.

However, when it is attempted to derive the speed of the three-dimensional object 224a by simply specifying the center position of the side of the three-dimensional object 224a in a horizontal plane, that is, the center position when the three-dimensional object 224a is viewed as a straight line as in FIG. 7C and deriving the speed of the center position, the speed cannot be derived stably and accurately because the center position changes depending on the degree of exposure in the image (depending on the condition in which the three-dimensional object 224a relatively moves forward or backward). This is because the center position changes by ½ of the rate of change of the position of a straight line when the three-dimensional object 224a is viewed as a straight line. As a result, the rate of change in speed of the center position of the side of the three-dimensional object 224a in a horizontal plane is ½ of the rate of change in actual speed of the three-dimensional object 224a.

It is considered to derive the speed of the three-dimensional object 224a on the basis of a part that enables tracking an edge on the side of the three-dimensional object 224, for instance, an end in the depth direction, but it is usually difficult to specify the position of the end in the depth direction and the end often moves forward or backward, and as a result, it is difficult to stably derive the speed.

In view of this problem, in this embodiment, speed derivation processing is changed depending on whether the entire side of the three-dimensional object 224 is included in the field of view, so that the accuracy of derivation of speed of the three-dimensional object 224 is improved.

Specifically, when it is highly likely that the side of the three-dimensional object 224 is not entirely included in the field of view and the three-dimensional object 224 satisfies determination conditions described later under which the end can be reliably specified, the speed derivation unit 176 derives the speed of the three-dimensional object 224 on the basis of the end of the side of the three-dimensional object 224 in the depth direction, that is, the end whose relative distance is relatively long.

The end (the leading end) of the side of the three-dimensional object 224 in the depth direction is used as a target because the edge of the front of a vehicle in a vertical direction likely appears clearly and the position of the front of the vehicle in the horizontal direction is thus easily specified, and as a result, it is highly possible to track an identical part in a time series manner.

Figure 8A:
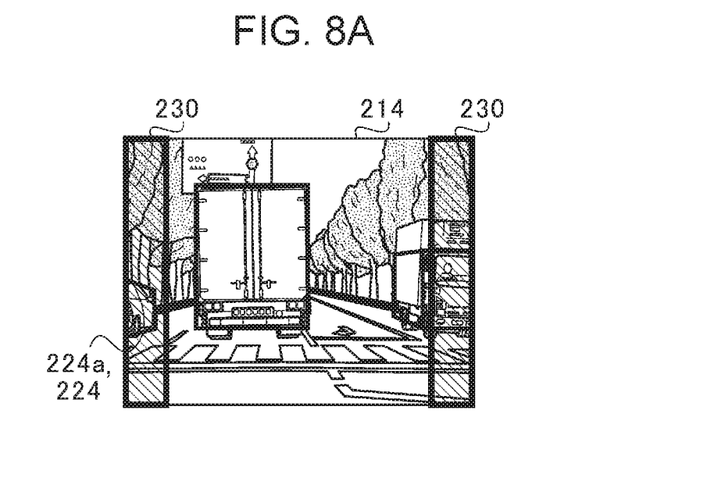
FIGS. 8A and 8B are illustrations depicting determination conditions.
Figure 8B:
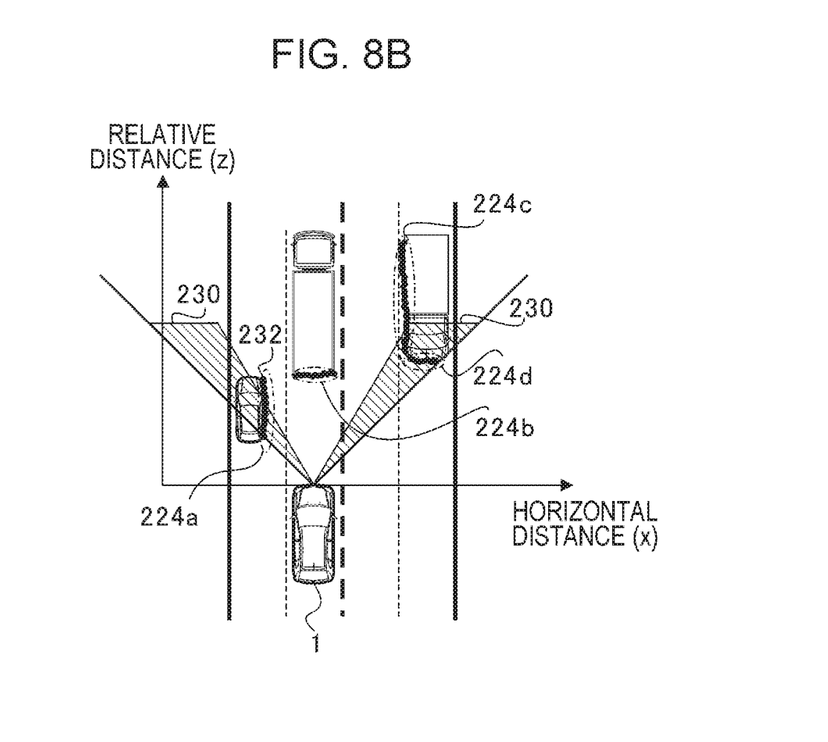

FIGS. 8A and 8B are illustrations depicting the determination conditions. The first determination condition is that an end area 230 includes the side of the three-dimensional object 224. The end areas 230 are strip-shaped areas positioned on end sides of the distance image 214 in the horizontal direction as indicated by hatching in FIGS. 8A and 8B. The width of the field of view of each of the end areas 230 on the left and right sides is approximately ⅒ of the total width of the field of view of the distance image 214 in the horizontal direction (accordingly, the width of an area other than the end areas 230 is ⁸⁄₁₀ of the total width) and the relative distance z in the depth direction in each of the end areas 230 is up to approximately 8 m. Needless to say, any configuration can be set as the field of view and the relative distance z of the end area 230. In addition, the field of view and the relative distance z of the end area 230 may be changed by using appropriate values in accordance with the driving conditions of the own vehicle 1, such as speed, driving roads, and weather.

When the end area 230 includes the side of the three-dimensional object 224, it is highly likely that part of the three-dimensional objects 224 is not included in the field of view at a horizontal end side (the left end side in this instance) of the distance image 214. As a result, when the three-dimensional object 224a satisfies the first determination condition, it is determined that part of the three-dimensional objects 224 is highly likely excluded from the field of view, and accordingly, the speed derivation unit 176 derives the speed of the three-dimensional object 224 on the basis of an end 232 of the side of the three-dimensional object 224a in the depth direction.

The second determination condition is that the length of the side of the three-dimensional object 224 in a horizontal plane (the length projected in a horizontal plane) gradually increases as time elapses. When the length of the side of the three-dimensional object 224 in a horizontal plane, for instance, the length between both end points in the case of viewing the three-dimensional object 224a as a straight line as illustrated in FIG. 8B gradually increases as time elapses, this means that the three-dimensional object 224 moves in the depth direction as viewed from the own vehicle 1, and thus, the three-dimensional objects 224 is highly likely to be a target for collision avoidance control or cruise control in a later period. As a result, when the three-dimensional object 224*a* satisfies the second determination condition in addition to the first determination condition, it is determined that the three-dimensional object 224*a* is adequate for being a target for deriving the speed, and accordingly, the speed derivation unit 176 derives the speed of the three-dimensional object 224 on the basis of the end 232 of the side of the three-dimensional object 224*a* in the depth direction.

While this instance describes the case in which the length of the side of the three-dimensional object 224 in a horizontal plane gradually increases as time elapses as the case in which the three-dimensional objects 224 is highly likely to be a target for collision avoidance control or cruise control in a later period, an advantageous effect of improving the accuracy of derivation of speed of the three-dimensional object 224 of the present application is also achieved by applying the present disclosure to the case in which the length of the side of the three-dimensional object 224 in a horizontal plane gradually decreases as time elapses.

The third determination condition is that the distance between an estimated position and an actual measured position of the end 232 of the three-dimensional object 224 in the depth direction is shorter than a predetermined distance. As will be described later, the position estimation unit 178 estimates a current position (an estimated position) of the end 232 of the side of the three-dimensional object 224 in the depth direction in accordance with a past position. The speed derivation unit 176 compares the estimated position of the end 232 of the three-dimensional objects 224 in the depth direction and an actual measured position having been obtained by actually measuring the position of the end 232 of the three-dimensional object 224 in the depth direction and accordingly determines whether the distance between the estimated position and the actual measured position is shorter than a predetermined distance. The predetermined distance can be set at any value depending on the specification accuracy of three-dimensional position information.

The actual measured position of the end 232 of the three-dimensional object 224 in the depth direction may be unreliable in some cases when the specification accuracy of three-dimensional position information is relatively low. By contrast, the estimated position of the end 232 of the three-dimensional objects 224 in the depth direction can be obtained as a relatively reliable value. The situation in which the distance between the actual measured position and the estimated position is relatively long indicates that the actual measured position has been obtained as an unreliable value, and thus, it is not appropriate to use the end 232 as the basis. As a result, when the three-dimensional object 224*a* satisfies the third determination condition in addition to the first and second determination conditions, it is determined that the position of the end 232 is reliably specified, and accordingly, the speed derivation unit 176 derives the speed of the three-dimensional object 224 on the basis of the end 232 of the side of the three-dimensional object 224*a* in the depth direction.

This instance describes the case in which the speed derivation unit 176 derives the speed of the three-dimensional object 224 on the basis of the end 232 of the side of the three-dimensional object 224*a* in the depth direction when the three-dimensional object 224 satisfies all the first, second, and third determination conditions. The speed derivation unit 176 may, however, derive the speed of the three-dimensional object 224 on the basis of the end 232 of the side of the three-dimensional object 224*a* in the depth direction when the three-dimensional object 224 satisfies one determination condition or two determination conditions selected from the group consisting of the first, second, and third determination conditions.

As described above, the speed of the three-dimensional objects 224 can be derived on the basis of an absolute position of the three-dimensional object 224 by using as the basis the end 232 of the side of the three-dimensional object 224 in the depth direction 224 under the conditions that the side of the three-dimensional object 224 is not entirely included in the field of view and the position of the end 232 is reliably obtained. Accordingly, when the side of the three-dimensional object 224 is not entirely included in the field of view of the distance image 214, it is possible to improve the accuracy of derivation of speed of the three-dimensional object 224.

However, when the three-dimensional object 224 is a vehicle simply driving straight on a lane other than a lane on which the own vehicle 1 drives, such a vehicle is incapable of being a target for collision avoidance control or cruise control. Always deriving the speed of the three-dimensional object 224 incapable of being a target for collision avoidance control or cruise control increases processing loads.

In this regard, the speed derivation unit 176 may not always derive the speed but derive the speed when the three-dimensional object 224 likely cuts into a lane on which the own vehicle 1 drives. The case in which the three-dimensional object 224 likely cuts into a lane on which the own vehicle 1 drives denotes, for instance, the case in which the three-dimensional object 224 ahead of the own vehicle 1 attempts to move from a lane to another lane on which the own vehicle 1 drives. With this configuration, it is possible to reduce processing loads to be used for deriving the speed of the three-dimensional object 224 incapable of being a target for collision avoidance control or cruise control.

In the embodiment described above, the speed derivation unit 176 derives the speed of the three-dimensional object 224 on the basis of the end 232 of the side of the three-dimensional object 224*a* in the depth direction when the three-dimensional object 224 satisfies the first, second, and third determination conditions. However, the three-dimensional object 224 whose side is not entirely included in the field of view does not always satisfy the first, second, and third determination conditions.

Thus, in parallel with the processing described above, the speed derivation unit 176 derives the speed of the three-dimensional objects 224 on the basis of the center position of the side of the three-dimensional object 224 in the depth direction. When the three-dimensional object 224 satisfies the first, second, and third determination conditions, the speed derivation unit 176 derives the speed of the three-dimensional object 224 on the basis of the end 232 of the side of the three-dimensional object 224 in the depth direction 224; when the three-dimensional object 224 does not satisfy the first, second, and third determination conditions, the speed derivation unit 176 derives the speed of the three-dimensional object 224 on the basis of the center position of the side of the three-dimensional object 224 in the depth direction.

With this configuration, regardless of whether the three-dimensional objects 224 satisfies the first, second, and third determination conditions, the speed of the three-dimensional object 224 can be securely derived. It is assumed that in one instance the three-dimensional object 224 does not satisfy the first, second, and third determination conditions and the speed of the three-dimensional object 224 is derived on the basis of the center position of the side of the three-dimensional object 224 in the depth direction. Although such a case is included, the speed of the three-dimensional object 224 is derived on the basis of the end 232 of the side of the three-dimensional object 224 in the depth direction 224 in another instance in which the three-dimensional object 224 satisfies the first, second, and third determination conditions, and as a result, it is possible to obtain a speed relatively close to the actual speed (a true value) of the three-dimensional object 224.

However, when the case in which the three-dimensional object 224 satisfies the first, second, and third determination conditions and the case in which the three-dimensional object 224 does not satisfy the first, second, and third determination conditions alternately occur for a relatively short period, the change of the speed of the three-dimensional object 224 may be excessively frequent and chattering may be caused.

In view of this situation, the speed derivation unit 176 may filter the speed of the three-dimensional object 224 by using, for instance, a low-pass filter (LPF) for the purpose of leveling speeds. In addition to this, the speed in the case in which the first, second, and third determination conditions are satisfied may be weighted heavier than the speed in the case in which the first, second, and third determination conditions are not satisfied.

With this configuration, it is possible to stably obtain the speed of the three-dimensional object 224.

Position Estimation Processing S208

The position estimation unit 178 estimates (traces) a current position (an estimated position) of the end 232 of the side of the three-dimensional object 224 in the depth direction in accordance with a past position by employing, for instance, a moving average calculation method or Kalman filter. The estimated position obtained in this manner is used for determination according to the third determination condition and also for estimating the position of the end 232 of the three-dimensional objects 224 in the depth direction in a subsequent frame.

Three-dimensional-object identification processing S210

The three-dimensional-object identification unit 180 identifies the three-dimensional object 224 identified by grouping as a particular specific object. For instance, when the size, the shape, and the speed of the three-dimensional object 224 are typical of vehicles and light-emitting sources such as brake lights and a high mount stop lamp are discovered at given rear positions, the three-dimensional-object identification unit 180 identifies the three-dimensional object 224 as a preceding vehicle.

As described above, in this embodiment, it is possible to improve the accuracy of derivation of speed of a vehicle other than an own vehicle. Furthermore, collision avoidance control can be appropriately performed for the three-dimensional object 224 such as a vehicle, when nothing but the side of the three-dimensional object 224 is viewed.

According to an example embodiment of the technology, a program also may be provided that causes a computer to serve as the vehicle exterior environment recognition apparatus 120, and a computer-readable recording medium that stores the program. Non-limiting examples of the recording medium may include a flexible disk, a magneto-optical disk, ROM, CD, DVD (Registered Trademark), and BD (Registered Trademark). As used herein, the term "program" may refer to a data processor that is written in any language and any description method.

The central controller 154 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the central controller 154 illustrated in FIG. 2.

The embodiment of the present disclosure has been described above with reference to the accompanying drawings, but needless to say, the present disclosure is not limited to the embodiment. It is understood that various modifications and alterations within the scope indicated in the appended claims may occur to those skilled in the art and are also embraced within the technical scope of the present disclosure.

It is noted that the steps of the vehicle exterior environment recognition method in the present specification are not necessarily performed in the order presented as the flowchart in a time series manner and may be performed while involving processing operations performed in parallel or a processing operation performed as subroutines.

The invention claimed is:

1. A vehicle exterior environment recognition apparatus mounted on a vehicle, the vehicle exterior environment recognition apparatus comprising:
a position derivation unit configured to derive three-dimensional positions of respective blocks from an image received from an imaging device;
a grouping unit configured to group the respective blocks and identify a three-dimensional object, wherein the three-dimensional object includes a side parallel to a traveling direction of the vehicle; and
a speed derivation unit configured to:
derive a speed of the three-dimensional object by focusing on a distal end of the side in the traveling direction when the three-dimensional object satisfies a determination condition where the side is seen in one of end areas of the image in a horizontal direction; and
derive the speed of the three-dimensional object in accordance with a center position of the side of the three-dimensional object in the traveling direction when the determination condition is not satisfied.

2. The vehicle exterior environment recognition apparatus according to claim 1, wherein the determination condition further includes a condition that a length of the side of the three-dimensional object in a horizontal plane increases as time elapses.

3. The vehicle exterior environment recognition apparatus according to claim 2, further comprising:
a position estimation unit configured to estimate an estimated current position of the distal end of the side of the three-dimensional object in the traveling direction in accordance with a past position of the distal end,
wherein the determination condition further comprises a condition in which a distance between the estimated current position estimated by the position estimation unit and an actual measured position of the distal end of the side of the three-dimensional object in the traveling direction is shorter than a predetermined distance.

4. The vehicle exterior environment recognition apparatus according to claim 3, wherein the speed derivation unit does not always derive the speed of the three-dimensional object but derives the speed of the three-dimensional object when the three-dimensional object likely cuts into a lane on which the vehicle travels.

5. The vehicle exterior environment recognition apparatus according to claim 2, wherein the speed derivation unit does not always derive the speed of the three-dimensional object but derives the speed of the three-dimensional object when the three-dimensional object likely cuts into a lane on which the vehicle travels.

6. The vehicle exterior environment recognition apparatus according to claim 1, further comprising:
a position estimation unit configured to estimate an estimated current position of the distal end of the side of the three-dimensional object in the traveling direction in accordance with a past position of the distal end,
wherein the determination condition further comprises a condition in which a distance between the estimated current position estimated by the position estimation unit and an actual measured position of the distal end of the side of the three-dimensional object in the traveling direction is shorter than a predetermined distance.

7. The vehicle exterior environment recognition apparatus according to claim 6, wherein the speed derivation unit does not always derive the speed of the three-dimensional object but derives the speed of the three-dimensional object when the three-dimensional object likely cuts into a lane on which the vehicle travels.

8. The vehicle exterior environment recognition apparatus according to claim 1, wherein the speed derivation unit does not always derive the speed of the three-dimensional object but derives the speed of the three-dimensional object when the three-dimensional object likely cuts into a lane on which the vehicle travels.

9. A vehicle exterior environment recognition method, comprising:
deriving a three-dimensional positions of respective blocks from an image received from an imaging device;
grouping the respective blocks and identifying a three-dimensional object, wherein the three-dimensional object includes a side parallel to a traveling direction of an own vehicle; and
deriving a speed of the three-dimensional object by focusing on a distal end of the side in the traveling direction when the three-dimensional object satisfies a determination condition where the side is seen in one of end areas of the image in a horizontal direction; and
deriving the speed of the three-dimensional object in accordance with a center position of the side of the three-dimensional object in the traveling direction when the determination condition is not satisfied.

10. A vehicle exterior environment recognition apparatus mounted on a vehicle, the vehicle exterior environment recognition apparatus comprising circuitry configured to
derive three-dimensional positions of respective blocks from an image received from an imaging device;
group the respective blocks and identify a three-dimensional object, wherein the three-dimensional object includes a side parallel to a traveling direction of the vehicle; and
derive a speed of the three-dimensional object by focusing on a distal end of the side in the traveling direction when the three-dimensional object satisfies a determination condition where the side is seen in one of end areas of the image in a horizontal direction; and
derive the speed of the three-dimensional object in accordance with a center position of the side of the three-dimensional object in the traveling direction when the determination condition is not satisfied.

* * * * *